United States Patent
Cohen et al.

(10) Patent No.: US 7,461,095 B2
(45) Date of Patent: Dec. 2, 2008

(54) IMAGE SERVER STORE SYSTEM AND METHOD USING COMBINED IMAGE VIEWS

(75) Inventors: Jason Cohen, Seatac, WA (US); Ryan Burkhardt, Redmond, WA (US); Bruce L. Green, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 223 days.

(21) Appl. No.: 11/155,069

(22) Filed: Jun. 17, 2005

(65) Prior Publication Data

US 2005/0240627 A1    Oct. 27, 2005

Related U.S. Application Data

(63) Continuation of application No. 10/172,953, filed on Jun. 17, 2002, now Pat. No. 6,947,954.

(51) Int. Cl.
*G06F 17/30* (2006.01)
(52) U.S. Cl. .................... 707/200; 707/204
(58) Field of Classification Search .......... 707/200, 707/204; 711/100
See application file for complete search history.

(56) References Cited

U.S. PATENT DOCUMENTS

| | | | |
|---|---|---|---|
| 5,142,680 A | 8/1992 | Ottman et al. | |
| 5,432,941 A | 7/1995 | Crick et al. | |
| 5,485,606 A * | 1/1996 | Midgdey et al. | 707/10 |
| 5,555,416 A | 9/1996 | Owens et al. | |
| 5,574,906 A | 11/1996 | Morris | |
| 5,634,052 A | 5/1997 | Morris | |
| 5,732,265 A | 3/1998 | Dewitt et al. | |
| 5,758,165 A | 5/1998 | Shuff | |
| 5,794,052 A | 8/1998 | Harding | |
| 5,813,008 A | 9/1998 | Benson et al. | |
| 5,813,017 A | 9/1998 | Morris | |
| 5,842,024 A | 11/1998 | Choye et al. | |
| 5,933,842 A | 8/1999 | Ross | |

(Continued)

FOREIGN PATENT DOCUMENTS

JP    2000222190    8/2000

(Continued)

OTHER PUBLICATIONS

Zhang et al., "A Modeling Perspective of Image-Based Installation," Dell White Paper, pp. 1-13, Mar. 2002, U.S.A.

(Continued)

*Primary Examiner*—John E Breene
*Assistant Examiner*—Thu-Nguyet Le
(74) *Attorney, Agent, or Firm*—Senniger Powers LLP

(57) ABSTRACT

An image server store having a combined image including a first image of a first software combined with other images of other software such that any one or more of the images can be restored from the combined image, and methods relating thereto. The method of making the combined image comprises creating a first image from a first software, creating a second image from the second software, and combining the first image and the second image into the combined image on the server store. Each image includes first descriptive data (metadata) corresponding to descriptive data of its software and includes file data corresponding to file data of its software.

11 Claims, 8 Drawing Sheets

U.S. PATENT DOCUMENTS

| | | | |
|---|---|---|---|
| 5,983,239 | A | 11/1999 | Cannon |
| 6,016,400 | A | 1/2000 | Day et al. |
| 6,021,415 | A | 2/2000 | Cannon et al. |
| 6,080,207 | A | 6/2000 | Kroening et al. |
| 6,110,228 | A | 8/2000 | Albright et al. |
| 6,131,192 | A | 10/2000 | Henry |
| 6,185,734 | B1 | 2/2001 | Saboff et al. |
| 6,247,128 | B1 | 6/2001 | Fisher et al. |
| 6,262,726 | B1 | 7/2001 | Stedman et al. |
| 6,286,138 | B1 | 9/2001 | Purcell |
| 6,298,443 | B1 | 10/2001 | Colligan et al. |
| 6,343,265 | B1 | 1/2002 | Glebov et al. |
| 6,385,766 | B1 | 5/2002 | Doran, Jr. et al. |
| 6,453,413 | B1 | 9/2002 | Chen et al. |
| 6,493,871 | B1 | 12/2002 | McGuire et al. |
| 6,496,974 | B1 | 12/2002 | Sliger et al. |
| 6,512,526 | B1 | 1/2003 | McGlothlin et al. |
| 6,598,223 | B1 | 7/2003 | Vrhel, Jr. et al. |
| 6,625,625 | B1 * | 9/2003 | Kihara et al. ............... 707/204 |
| 6,658,659 | B2 | 12/2003 | Hiller et al. |
| 6,681,323 | B1 | 1/2004 | Fontanesi et al. |
| 6,707,986 | B2 | 3/2004 | Nishi et al. |
| 6,711,624 | B1 | 3/2004 | Narurkar et al. |
| 6,772,192 | B1 | 8/2004 | Fulton et al. |
| 2002/0045441 | A1 | 4/2002 | Ralston et al. |
| 2002/0156877 | A1 | 10/2002 | Lu et al. |
| 2002/0174329 | A1 | 11/2002 | Bowler et al. |
| 2002/0194398 | A1 | 12/2002 | Bentley et al. |
| 2003/0001856 | A1 * | 1/2003 | Sawada et al. ............... 345/581 |
| 2003/0120688 | A1 | 6/2003 | Hill et al. |
| 2003/0233379 | A1 | 12/2003 | Cohen et al. |
| 2004/0070678 | A1 | 4/2004 | Toyama et al. |
| 2004/0218902 | A1 | 11/2004 | Yanagita |

FOREIGN PATENT DOCUMENTS

| | | |
|---|---|---|
| JP | 2001331308 | 11/2001 |
| JP | 2002041297 | 2/2002 |
| JP | 2002132603 | 5/2002 |

OTHER PUBLICATIONS

White Paper, "Microsoft Windows 2000 Server—Remote Operating System Installation," Microsoft Corporation, pp. i-iv, 1-41, 1999, U.S.A.

* cited by examiner

IMAGE SERVER STORE SYSTEM AND METHOD USING COMBINED IMAGE VIEWS

TECHNICAL FIELD

The present invention relates to the field of disk imaging. In particular, this invention relates to a server storage system and method having multiple individual images which have been collapsed into a single combined image from which any one or more of the individual images may be modified or recreated onto a destination device.

BACKGROUND OF THE INVENTION

Individual software images each include a large amount of data. In general, software images are increasing in size and take up increasingly large amounts of persistent and/or non-persistent storage space for a given computer. Historically, this size has grown at an exponential rate. For example, in certain cases there is a need to capture a copy of an installed operating system, applications, utilities, or other data (sometimes referred to as "capturing a volume"). One purpose of the captured copy is for creating an image including data that can be reused at a later date, such as by being redistributed to other computers. Frequently, there is a tremendous amount of space taken up by the captured copy and its data. Usually, multiple images are copied onto a single computer-readable media. These multiple images on the same media differ typically in only certain respects, e.g., based on the language of the installed OS, which applications (and versions of those applications) are included on that image, etc. Some multiple images are merely different SKUs or editions of the same program. The result is that the majority of the data in those multiple images is common, which creates a large amount of redundant space across images on the same media that could be used for other information.

These problems can be amplified in the context of an image server store which stores multiple copies of a program for copying onto a destination device. The multiple copies generally include large amounts of the same data so that separate, multiple copies tend to require large amounts of storage space on the server. Another disadvantage is that the data can not be easily replicated over low bandwidth connections.

For these reasons, an image server store system and method for reducing the amount of redundant space is desired to address one or more of these and other disadvantages.

SUMMARY OF THE INVENTION

The invention includes a common image server storage system and method that configures the contents of the multiple images on a server store so that common data across the images is only stored once. Thus, the invention minimizes or eliminates redundant data found between multiple images contained in a single store where each image is a single integrated file image imparted to a server store as compared to a collection or aggregation of files.

Advantages of the invention include minimizing the server storage requirements of the multiple images and facilitating the common servicing of those pieces of data that are common across the multiple images. This creates a rich store that can interpret the data within the image and adjust the contents of the data repository such that data common across the images is only stored once. Thus, servicing of those pieces of data common across multiple images only needs to be done once, not once for each image, and the size of the image store becomes greatly reduced.

In one form, the invention is a system from which a selected one or more of any of a plurality of images of software may be selectively transferred to a destination device. The system comprises a server store storing one or more combined images thereon, each combined image including a first image of a first software and including a second image of a second software. The combined image comprises a header of the combined image; a first metadata of the first image; a second metadata of the second image; a first file data of file data of the first image and not of the second image; a second file data of file data of the second image and not of the first image; a common file data of file data of both the first image and the second image; and a signature of the combined image whereby the first image and/or the second image can be imaged from the combined image and whereby the size of the combined image is less than the total size of the first image and the second image.

In another form, the invention includes a method of creating an integrated image on a server store which integrated image includes images of a first software and of a second software. The method comprises creating a first image from the first software, creating a second image from the second software, and combining the first image and the second image into the integrated image stored on the server store. The first image includes first descriptive data corresponding to descriptive data of the first software and includes first file data corresponding to file data of the first software. The second image includes second descriptive data corresponding to descriptive data of the second software and includes second file data corresponding to file data of the second software. The first image and/or the second image can be recreated from the integrated image.

The invention also includes a method of combining a first image including a first software and a second image including a second software, wherein the first and second images include common file data, into a single combined image from which the first image and/or the second image can each be re-created by imaging onto a destination device. The method comprises:

identifying the common file data in both the first image and the second image;

separating the first image into a first header, a first metadata, a first file data, the common file data and a first signature;

separating the second image into a second header, a second metadata, a second file data, the common file data and a second signature;

combining the first metadata, the second metadata, the first file data, the second file data, and the common file data into a single image on the server store, the single image comprising the single combined image having a header and a signature.

The invention also includes a method of combining a first software and a second software into a single combined image on a server store from which a first image of the first software and/or a second image of the second software can each be re-created onto a destination device by imaging. The method comprises:

converting the first software into a base image on the server store having metadata pointing to file data;

generating a combined digest of identifiers of all files identified by the metadata of the base image on the server store;

converting the second software into a second image having metadata pointing to file data;

reading a first file of the second image;

generating an identifier of the read first file of the second image;

adding the first file to the files of the base image on the server store and updating the combined digest and the metadata of the base image if the identifier of the read first file of the second image is not in the combined digest; and for each of the remaining files of the second image:

reading a next file of the second image;

generating an identifier of the next read file of the second image; and adding the next read file to the files of the combined image and updating the combined digest and the metadata of the base image if the identifier of next read file of the second image is not in the combined digest.

In yet another form, the invention is a method of creating an image of a data structure of software on a destination device from a server store having a combined image including the first image and a second image. The method comprises:

copying an image of descriptive data of the first image from the combined image to a first destination device;

copying an image of the file data of the first image from the combined image to the first destination device.

In another form, the invention is a computer-readable medium of a destination device having stored thereon a first image of a data structure of a first software which first image is a copy from a combined image including the first image and one or more other images. The medium comprises an image of descriptive data of the first software copied from the combined image and an image of file data of the first software copied from the combined image.

In another form, the invention comprises a system comprising a server store having a combined image from with a first image and a second image different from the first image can be re-created, a link and a destination device connected to the server store via the link, the destination device having the first image thereon, which first image on the destination device was copied from the combined image via the link.

In another form, the invention is a method comprising copying a combined image including a first image and a second image onto a server store, linking the server store to a destination device and copying the first image onto the destination device via the link by copying the first image from the combined image.

In another form, the invention is a system for manipulation by a computer of an integrated image of multiple software programs stored on a server store. The integrated image has common files shared by a plurality of the software programs and unique files unique to a particular one of the software programs. The computer and the image store are connected to a data communication system. The system comprises a driver executing on the computer to provide access to the server store via the data communication system, the driver comprising one or more components for manipulating the common files and/or the unique files.

In yet another form, the invention comprises a method for manipulation by a computer of an integrated image of multiple software programs stored on a server store. The integrated image has common files shared by a plurality of the software programs and unique files unique to a particular one of the software programs. The computer and the server store are connected to a data communication system. The method comprises accessing the server store and manipulating the common files and/or the unique files.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
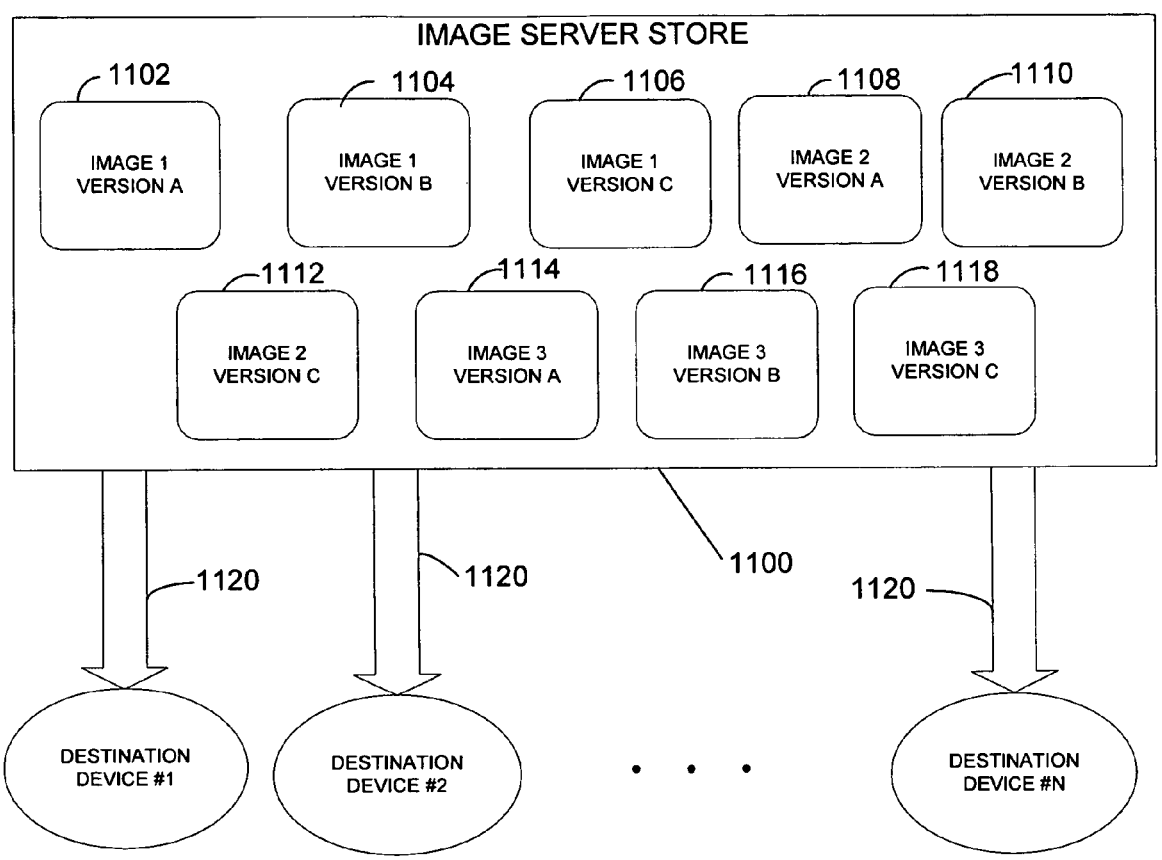
FIG. 1 is a block diagram of an image server storage system according to the prior art wherein each disk image is separately and independently stored on a computer readable medium (CRM).

Referring first to FIG. 1, a block diagram of an image server storage system according to the prior art is illustrated. In general, reference character 1100 refers to a image server store having a plurality of disk images 1102-1118 separately and independently stored on CRM. Many of these images may have common data. For example, images 1102-1106 correspond to versions A, B and C of the same program (image 1), respectively. As another example, images 1108-1112 correspond to versions A, B and C of another program (image 2). As another example, images 1114-1118 correspond to versions A, B and C of another program (image 3). However, each image is separately stored so that it can be copied to a destination device such as a destination device #1 through destination device #N.

The image server store 1100 is selectively linked to the plurality of destination devices #1 through #N. This linking, as indicated by arrows 1120, may be a physical interconnection such as a hardware connection or a fiber optic line. In addition or alternatively, this linking may be a wireless interconnection such as a radio frequency (RF) or infrared (IR) transmission. The purpose of this linking is to allow a selected one or more of the images 1102-1118 to be imaged from the image server store 1100 to a selected destination device. For example, if image 1102 of image 1 version A is to be loaded onto destination device #2, image 1102 would be copied to destination device #2 via link 1120. Thus, this setup allows any one or more images 1102-1118 to be selectively copied to any one or more destination devices #1 through #N via link 1120.

As noted above, one disadvantage of the prior art system illustrated in FIG. 1 is that a large amount of CRM is needed for each of the images 1102-1118. For example, if each image is 450 megabytes (MB) in size, 9×450 MB or 4050 MB of CRM would be needed to accommodate each of the nine (9) images on the server store 1100.

Figure 2:
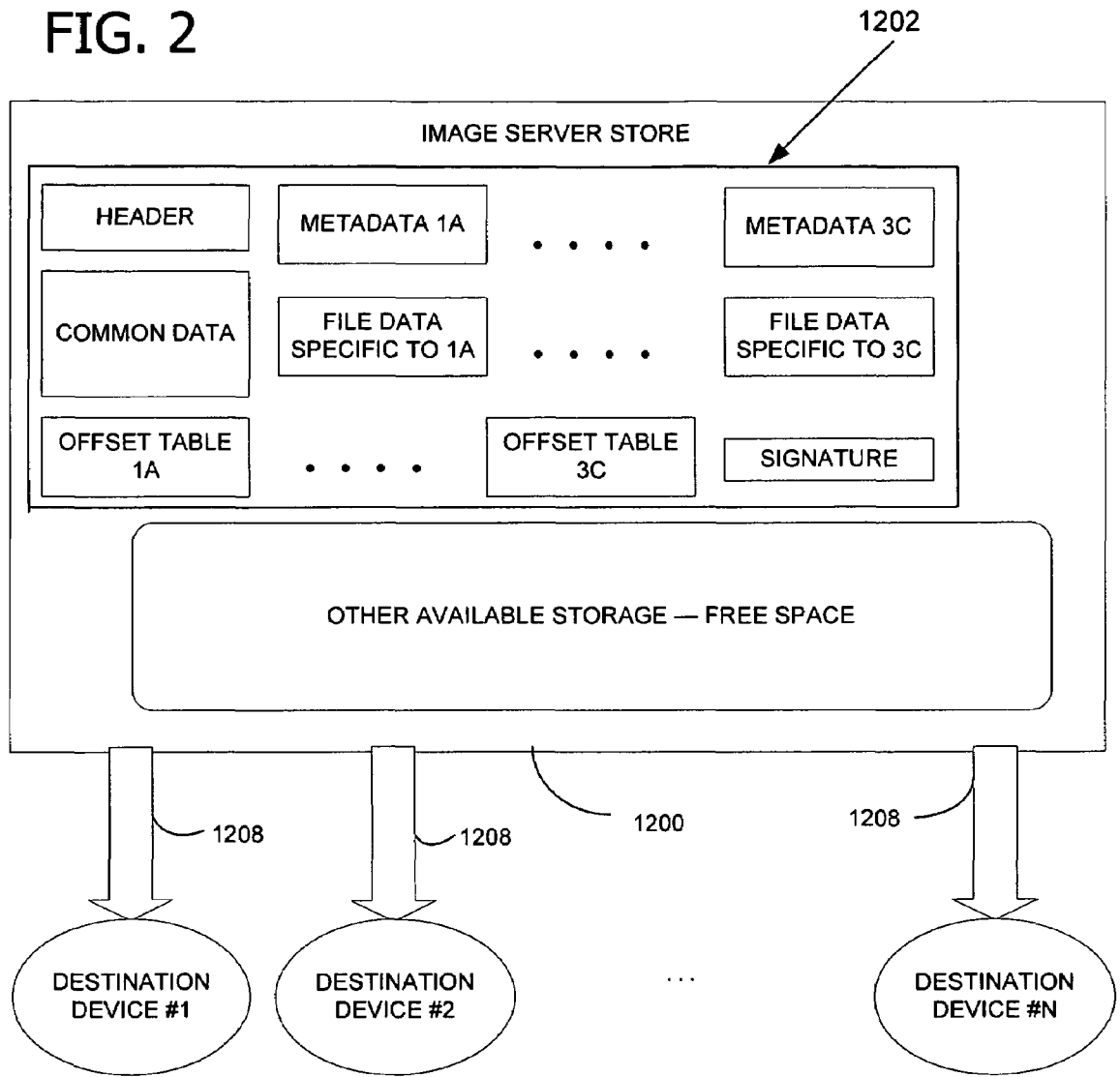
FIG. 2 is a block diagram of an image server storage system according to the invention wherein combined disk images are stored on CRM as one integrated file image.

Referring next to FIG. 2, a block diagram of an image server storage system according to the invention is illustrated wherein combined disk images are stored on CRM. In general, reference character 1200 refers to an image server store having an integrated or combined image 1202 separately and independently stored on CRM. Each integrated image is a combination of various images which share common file data, as will be described in detail below. Common data is only copied once into the integrated image. In this example, integrated image 1202 is a combination of versions A, B and C of image 1 and versions A, B and C of image 2 and versions A, B and C of image 3, each of which may be different image editions of the same software program. File data common to versions A, B and C of images 1, 2 and 3 would only appear once within the integrated image 1202. Thus, the integrated image includes a header, metadata files for versions 1A through metadata 3C, file data files specific to versions 1A to 3C, offset tables for versions 1A through 3C, common data shared by all versions and a signature. Similarly, other integrated images, not shown, may be part of the image server store 1200.

Each integrated image 1202 is separately stored so that the image or selected portion of the image, as noted below, can be copied to a destination device. The image server store 1200 is selectively linked to a plurality of destination devices #1 through #N. This linking, as indicated by arrows 1208, may be a physical interconnection such as a hardware connection or a fiber optic line. In addition or alternatively, this linking may be a wireless interconnection such as an RF or IR transmission. The purpose of this linking is to allow a selected one or more or part of one or more of the image 1202 or other images on the server store to be imaged from the image server store 1200 to a selected destination device. For example, if image 1 version A is to be loaded onto destination device #2, the portions of image 1202 corresponding to image 1 version A (i.e., image 1102 in FIG. 1) would be copied to destination device #2 via link 1208. Thus, this setup allows any one or more or portions of one or more of the integrated image 1202 to be selectively copied to any one or more destination devices #1 through #N via link 1208.

As noted above, one advantage of the system illustrated in FIG. 2 is that a much smaller amount of disk capacity (or volume) is needed for each of the integrated image 1202 as compared to the disk capacity needed for images 1102-118. This makes it easier to sync up with other image servers over low bandwidth connections (where as before every new image replicated, now only the data that is unique to the new image or the delta to the image needs to be replicated). For example, suppose each of the images 1102-118 includes 350 MB of common filed data and 100 MB of unique data. As a result, the integrated image 1202, which is a combination of 9 images (images 1102-118 of FIG. 1), would be 1250 MB (e.g., 350 MB of common data plus 9×100 MB or 900 MB of unique data from the 6 images). Thus, in the FIG. 2 system according to the invention, only 1250 MB of disk capacity is needed to accommodate the first and second combined images from which any one or more of the 9 images may be imaged to the destination devices. In contrast, as noted above, since each image is 450 MB in size, 4050 MB of disk capacity is needed to accommodate each of the 9 images on the prior art server store 1100 of FIG. 1. As a result, the image server store 1100 requires 4050 MB of disk capacity to store 9 images from which any one or more of the 9 images may be copied to a destination device whereas the image server store 1200 requires 1600 MB of disk capacity to store 2 combined images from which any one or more of the 9 images may be copied to a destination device. Thus, image server store 1200 has more available storage (e.g., 2450 MB of disk capacity) as compared to image server store 1100, both of which store information from which 9 images may be imaged to a destination device.

In one aspect of the invention of the image server store 1200 of FIG. 2, a system for manipulation by a computer (not shown) of the integrated image 1202 is contemplated. As noted above, the integrated image includes multiple software programs stored on the server store and has common files shared by the plurality of the software programs and unique files unique to a particular one of the software programs. In this system, it is contemplated that the computer and the image store are connected to a data communication system. The system would include a driver executing on the computer to provide access to the server store via the data communication system. The driver comprises one or more components for manipulating the common files and/or the unique files. Thus, a method for manipulation by a computer of the integrated image of multiple software programs stored on a server store is provided. The method comprises accessing the server store and independently manipulating the common files and/or the unique files.

Figure 3:
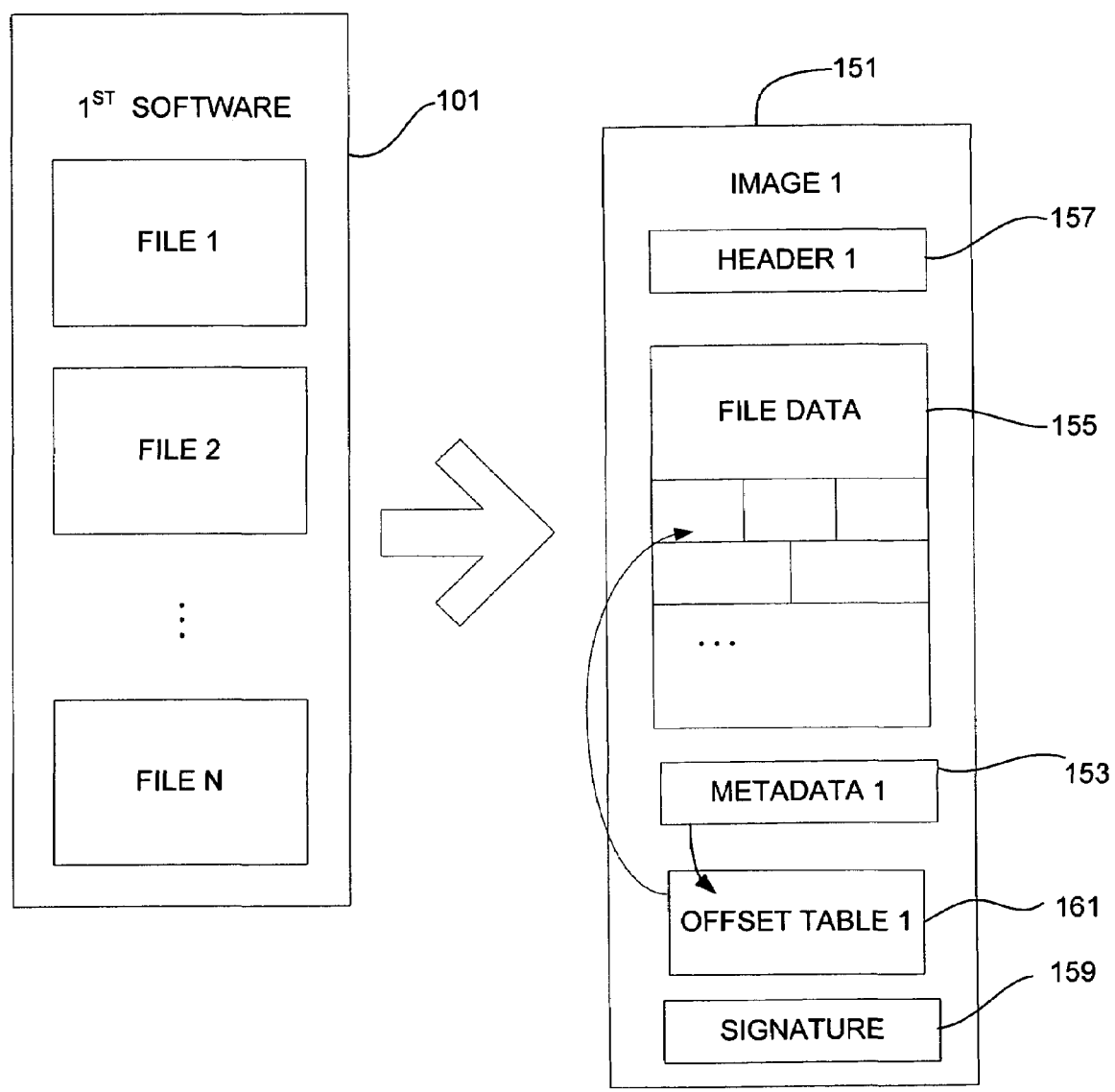
FIG. 3 is an exemplary diagram illustrating the conversion of a first software to a first image for use as a combined image according to the invention.

Referring first to FIG. 3, in order to permit combining of various related and/or unrelated software items (herein referred to as programs) on a server store, each individual software program 101 is converted into an image 151 including an image of descriptive data of the software 101 and an image of the file data of the software 101. "Images" and "imaging" as used herein is also referred to as "disk images," "disk imaging," "volume images" and/or "volume imaging."

The descriptive data of the first software 101 includes information representing the layout of the image 151 and is referred to as metadata 153. Essentially, metadata is all information needed for a file or file system such as a file directory to represent the file. The metadata may include any one or more of the following: file names (short or long), attributes, file times (e.g., create/access/modify), compression formats, locations (e.g., directories), directory structures, security information (e.g., access control list (ACL)) and/or stream names. By some definitions and in certain contexts, metadata may be defined to include any information which is not file data and may be viewed as including a header, an offset table and/or a signature. In this disclosure, the header, offset table and signature are separately illustrated for clarity.

The file data 155 includes any binary file data that is not metadata including but not limited to the following: the actual binary data of a particular file, stream data and/or any data of significant size. In general, the image 151 is stored on a computer-readable medium as a data structure of the software 101. As will be noted below in greater detail, one purpose of the image 151 is so that it can be combined with one or more other images having the same data structure into a combined image so that the first image 151 and/or any of the one or more other images of the combined image can be restored by imaging from the combined image. For example, the medium on which image 151 is stored may include one or more other images comprising a second image of descriptive data of a second software and a second image of file data of the second software. In some cases, at least part of the file data of the first image 151 is the same as at least part of the file data of the second image so that the image 151 may be combined with the other images, as will be discussed in greater detail below. Image 151 also includes a header 156 identifying the image 151 and a signature 159 corresponding to the image 151.

In addition, the image 151 includes an offset table 161 including the following information for each file: a unique identification, location, size, any flags relating to the file and an optional hash of the file, as described below. As illustrated in FIG. 1, the metadata 153 points to the offset table 161 and the offset table 161 points to the file data 155. In particular, the metadata 153 has the unique identifier that can be found in the offset table 161. The offset table 161 includes the offset of the location of the file data in the image.

As shown in FIG. 1, the metadata 153 is positioned between the file data 155 and the offset table 161, which is one preferred embodiment of the layout of the image 151 according to the invention. The remaining figures illustrate the metadata between the header and the file data for convenience. In general, it is contemplated that the various information may be located in various places within the image so that the invention is not intended to be limited to the locations illustrated.

Figure 4:
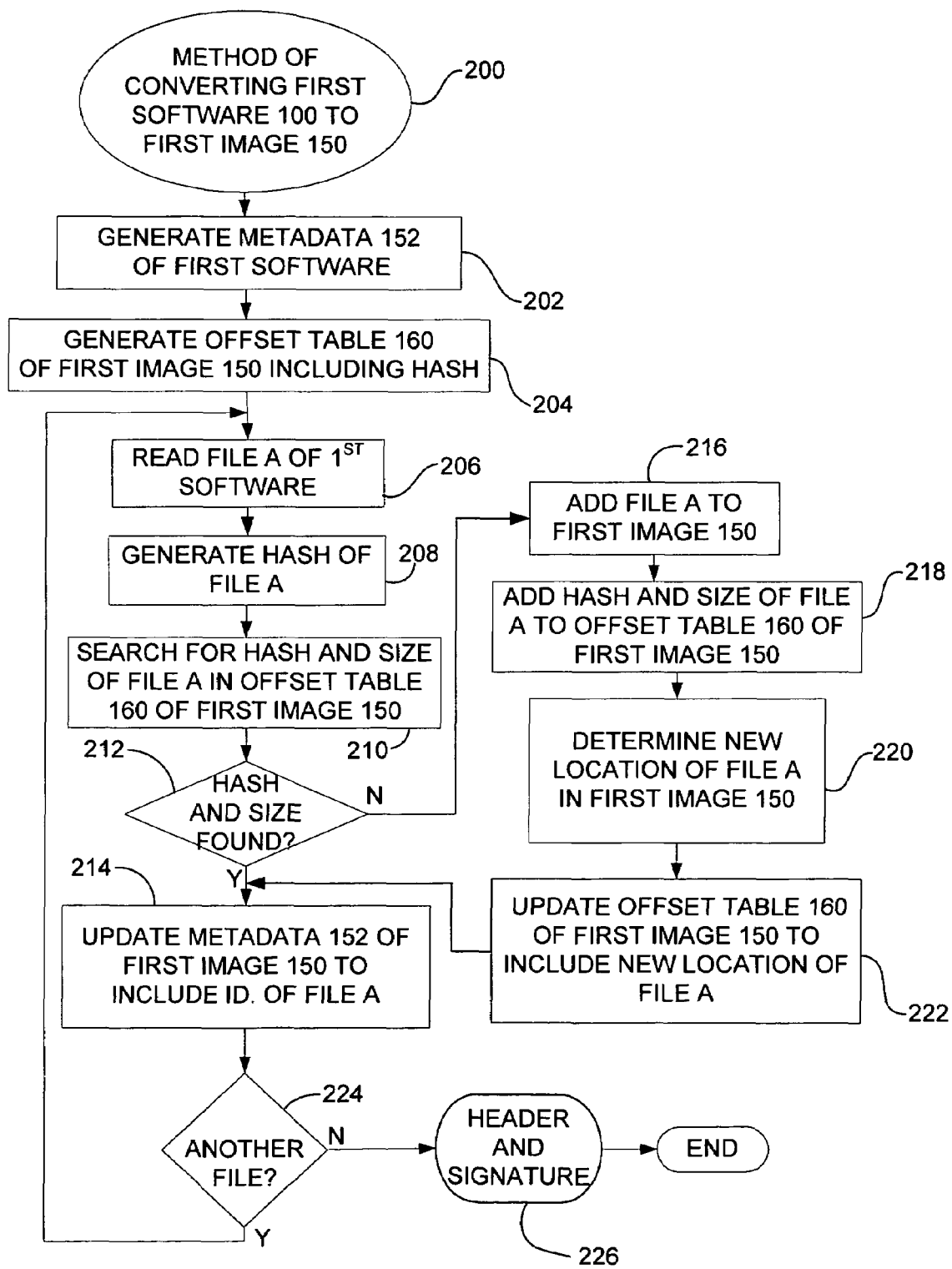
FIG. 4 is an exemplary flow chart illustrating operation of one method according to the invention for creating a first image for use as a combined image on a server store.

FIG. 4 illustrates a method of converting the first software 101 into the first image 151 having a data structure which can be combined with one or more other images having the same data structure. The combined image is stored on a server stores that the first image 151 and/or any one or more of the other images of the combined image can be recreated onto a destination device by imaging from the combined image on the server store. The method 200 of converting begins with generating metadata 152 of the first software at 202. Next, an offset table 161 of the first image 151 including a hash for each file is generated at 204. The hash list of the offset table 161 is a list of identifiers or other short unique descriptors of each of the files which are presently in the first image 151. Initially, the hash list would be empty since no files have yet been added to the first image 151.

At 206, a first file, called file A, of the first software 101 is read and at 208 a hash of the read file A is generated. The hash of file A is an identifier of the information in the file A. At 210, a search in the offset table 161 for the hash and size of file A is conducted to determine whether or not the hash for file A (and its size) is within the offset table 161. If found at 212, this indicates that file A is already a part of image 151 and does not have to be added to the image 151. At this point at 214, the metadata 152 is updated to include the unique identification (ID.) of file A which is already in the first image 151.

If it is determined at 212 that the hash and size of file A are not in the offset table 161 of the first image, the method proceeds to 216 to add file A to the first image 151 and at 218 the hash and size of file A are added to the offset table 161 of the first image 151. Next, at 220 the new location of the file A in the first image 151 is determined and at 222 the offset table 161 of the first image 151 is updated to include the new file location of file A. The method proceeds from 222 to 214 to update the metadata 152 of the first image 151 to include the unique identification of file A. Proceeding to 224, a determination is made as to whether anymore files need to be read from the first software 101. If there is more than one file as part of the first software 101, the method returns to 206 to read the next file of the first software 101. In the general case, A equals A+1 for each iteration of file reading. In the first iteration, A equaled 1 so that file 1 of the first software 101 was read. In the second iteration, A equals 2 so the second file is read and so on until all of the N files of the first software 101 are read. After all the files are read, the method proceeds to 226 to create a header and signature for the image 151 and then ends.

The method of FIG. 4 may be performed manually or with the aid of a tool or performed automatically with a tool programmed to provide the process of FIG. 4. As noted above and as illustrated in FIG. 3, the hash of the offset table 161 is optional for several reasons. First of all, it is not necessary to employ a hash list to determine what file data is a part of the image 151. However, using hash identifiers in a hash list simplifies and speeds up the process of determining whether or not an additional file needs to be copied to an image. Second, the hash list need not be a part of the image 151 and could be a temporary list used only during the process of converting the first software 101 into the first image 151. However, there are some advantages to maintaining a hash list of each mounted image so that as additional information is added to an image, or as an image is modified or updated, an up to date hash list of the image can be checked to determine whether or not the information that is being changed is redundant with other information that is already part of the image. In general, the metadata 152 and offset table 161 for image 151 are created on CRM and saved to a file which is added to image 151. If hash identifiers are to be part of the offset table 161, the hash identifiers are added to the table when it is created on CRM.

Figure 5:
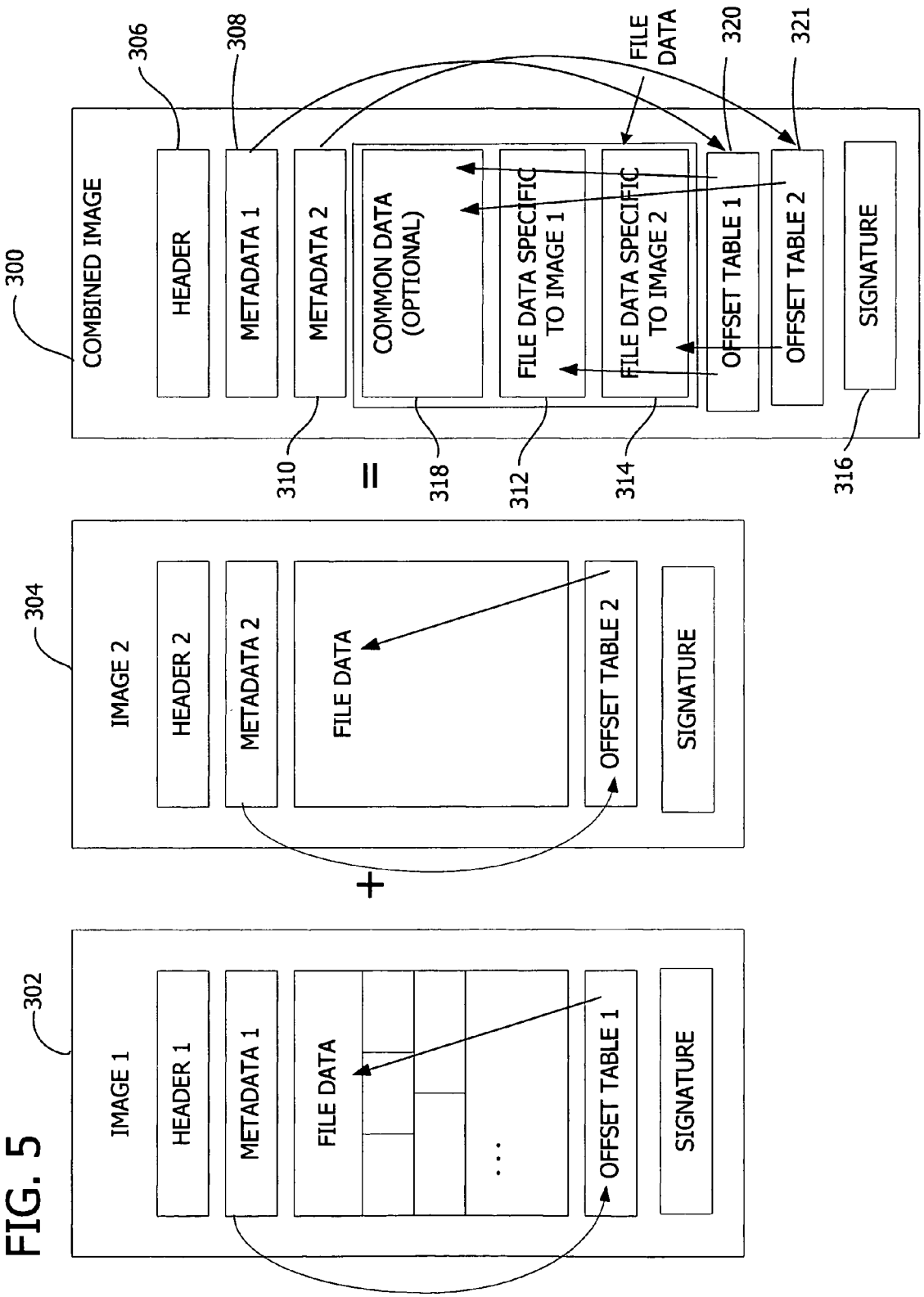
FIG. 5 is an exemplary embodiment of the invention illustrating schematically the layout of image 1 and of image 2 which may be combined into a combined image on a server store.

One reason for converting the first software into a first image is so that the first image can be combined with other images to create a combined image on a server store. For example, as shown in FIG. 5, a combined image 300 includes a first image 302 of a first software and the second image 304 of a second software. The combined image includes a header 306 of the combined image 300, a first metadata 308 corresponding to the first image 302, a second metadata 310 corresponding to the second image 304, a first file data 312 of file data of the first image 302 and not of the second image 304, a second file data 314 of file data of the second image 304 and not of the first image 302, and an offset table 320 and a signature 316 of the combined image 300. In cases where the first image 302 and the second image 304 have some of the same file data, such common data 318 is only copied once to the combined image. As a result, the size of the combined image 300 is less than the total size of the first image 302 and the second image 304. One advantage of the combined image 300 is that the first image 302 and/or the second image 304 can be restored from the combined image 300, as will be described below in greater detail with respect to FIG. 7.

As illustrated in FIG. 5, a method of creating the combined image 300 includes first creating the first image 302 from the first software, and creating the second image 304 from the second software followed by combining the first image 302 and the second image 304 into the combined image 300. As noted above and as illustrated in FIG. 5, the first image 302 includes first descriptive data (metadata 1) corresponding to descriptive data of the first software which points to the offset table (offset table 1) which points to first file data corresponding to file data of the first software. Similarly, the second image 304 includes second descriptive data (metadata 2) corresponding to descriptive data of the second software which points to the offset table (offset table 2) which points to second file data corresponding to file data of the second software. In cases where the first and second images both include at least some common file data 318, the combined image 300 includes only one copy of the common file data 318.

In a case where two images or more than two images are to be combined and it is known that the images have common file data, the following approach may be employed. Initially, the common file data of both the first and second images would be identified. The first image 302 would be separated into a first header, a first metadata, a first file data, the common file data, a first offset table and a first signature. Similarly, the second image 304 would be separated into a second header, a second metadata, a second file data, the common file data, a second offset table and a second signature. In order to create the combined image, the following would be combined: the first metadata, the second metadata, the first file data, the second file data, and the common file data into a single image which comprises the single combined image. A header, an offset table and a signature would then be added to the combined image 300. As a result, the combined image 300 includes first descriptive data (metadata 1) corresponding to descriptive data of the first software which points to the offset table (offset table 1) which points to first file data and the common file data corresponding to file data of the first software. In addition, the combined image 300 includes second descriptive data (metadata 2) corresponding to descriptive data of the second software which points to the offset table (offset table 2) which points to second file data and the common file data corresponding to file data of the second software.

Although not illustrated in FIG. 5, it is contemplated that a list of identifiers such as a hash of each of the files may be created and used in the process of combining the first image 302 and the second image 304. Initially, a list of identifiers (e.g., a hash) of the files in the combined image 300 would be created. For each of the file data in the first image 302, a file data of the first image 302 would be read and an identifier would be associated with each read file based on the contents of the file data. For each of the file data of the second image, a file data of the second image 304 would be read and for each read file an identifier would be associated with each of the read files based on the contents of the file data. In this situation, the read file data would be combined or added to the combined image 300 when the identifier of the read file is not in the list of identifiers of the combined image 300. As a new file is added to the combined image 300, the descriptive data (metadata 1 and/or metadata 2) would be updated to include the identification of the new file data which was added to the combined image 300 and the offset table would be updated to include the new location of the new file data. The identification of each file must be unique so that it does not collide with the identification of other files. In this regard, each file identification is verified as unique and modified to be unique if it is not before the metadata is updated.

Figure 6:
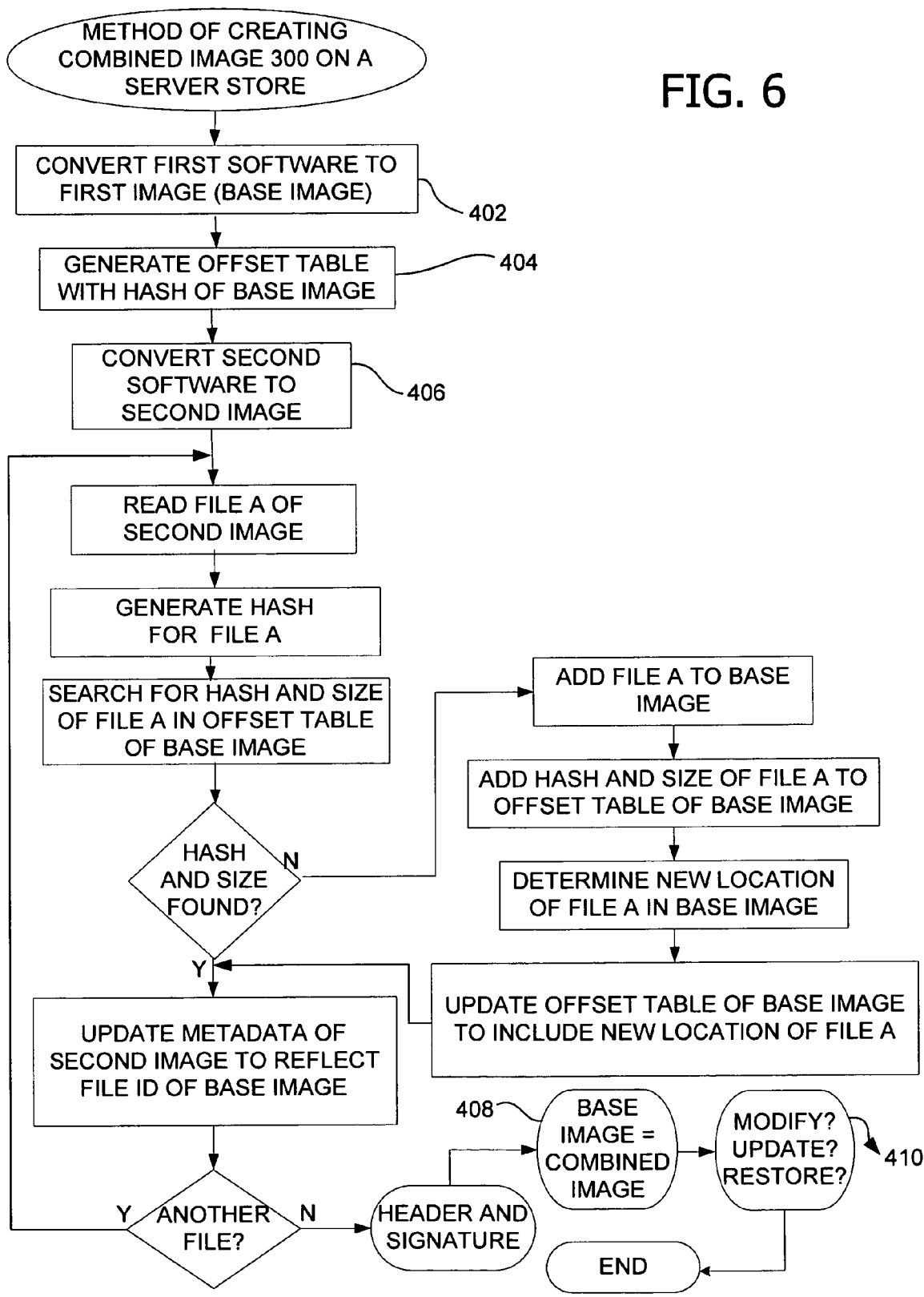
FIG. 6 is an exemplary flow chart illustrating operation of a method according to the invention for creating a combined image on a server store.

Referring to FIG. 6, a method is illustrated of combining a first software and a second software into a single combined image 300 onto a server store from which a first image 302 of the first software and a second image 304 of the second software can each be recreated by imaging on to one or more destination devices. Initially, the first software is converted into a base image having metadata pointing to its file data at 402. In general, the base image is the image to which files will be added and may be a pre-existing image or a newly created image For example, pre-existing image 302 may be viewed as the base image to which image 304 would be added. A combined offset table including the hash list of identifiers of all the files identified by the metadata of the base image is next generated at 404. Next at 406, the second software is converted into a second image 304.

The remainder of the substantive portion of adding the second image 304 to the base image 302 of the method illustrated in FIG. 6 corresponds to the substantive portion of the method of FIG. 4. In particular, for each file the second image has read, a hash for each file is generated, and a search for the hash and size of the read file is made within the hash list of the offset table of the base image. If the hash and size of the read file are in the offset table indicating that the file data is part of the base image, the metadata of the base image is updated to include the unique identification of the file in the base image. If the hash of the read file is not in the hash list, the file is added to the base image, the hash and size of the file are added to the offset table of the base image, the new location of the file is determined and the offset table of the base image is updated to include the new location of the new file. Next, the metadata of the second image is updated to reflect the unique identification of the base image. This is done for each file of the second image 304. When all the files have been considered, a header and signature of the base image is created and the base image now becomes the combined image at 408 from which the first and second images can be recreated.

FIG. 6 also illustrates at 410 that file data of the combined image can be modified, updated or restored. In particular, first file data of the first image may be modified, updated or restored and an offset table of the first image may be modified to point to the modified, updated or restored first file data. In addition, second file data of the second image may be modified, updated or restored and an offset table of the second image may be modified to point to the modified, updated or restored second file data. Furthermore, common file data of the combined image may be modified, updated or restored and offset tables of the common image may be modified to point to the modified, updated or restored common file data. One advantage to the latter aspect is that common data need only be modified, updated or restored once for all images (e.g., the first and second images). This is in contrast to the past wherein the first and second images were separately stored and the common data would have to be updated in the first image and also updated in the second image.

Figure 7:
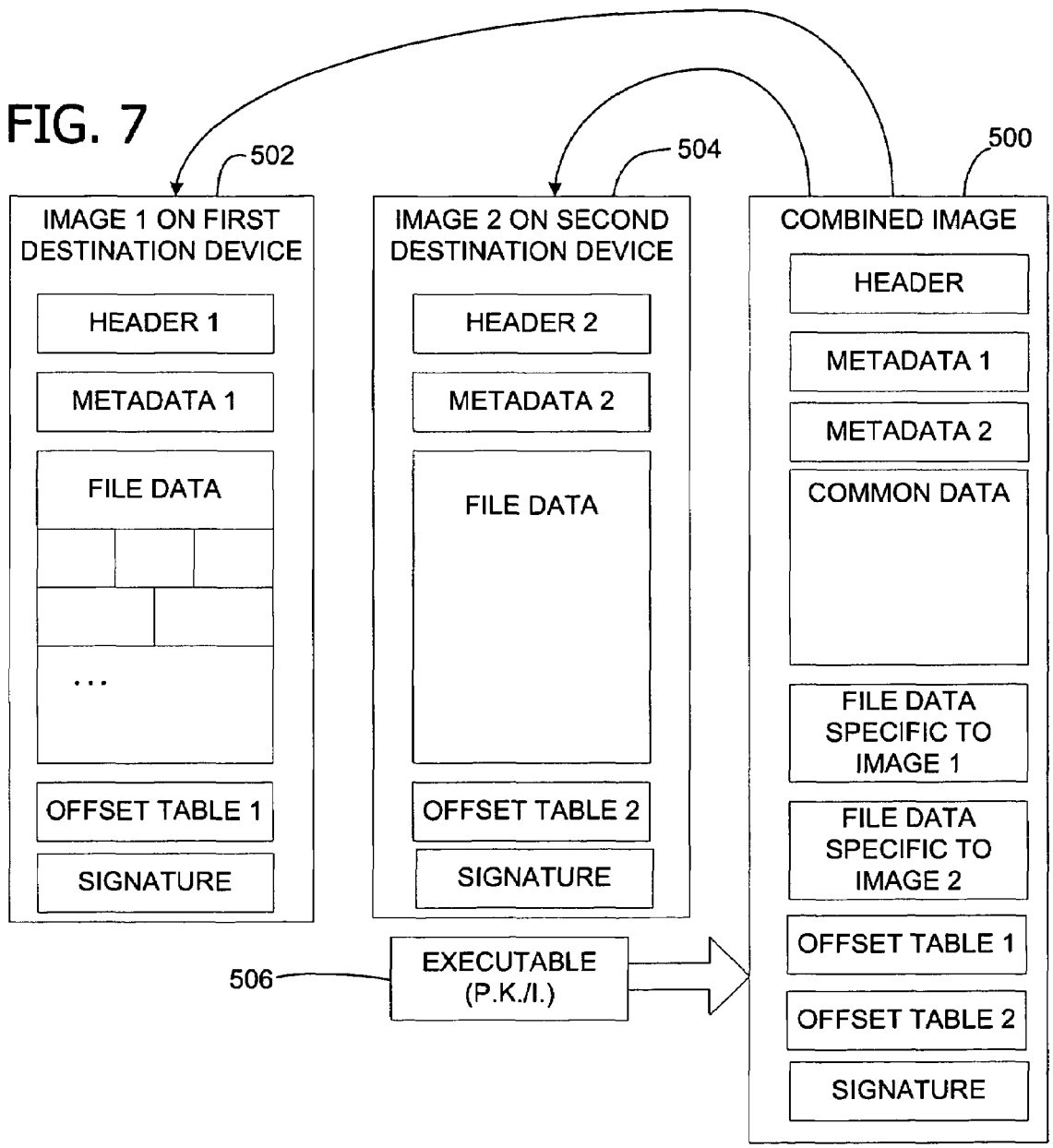
FIG. 7 is a block diagram illustrating an exemplary computer-readable medium (such as a server store) on which the combined image may be stored so that image 1 can be restored by imaging to a separate second destination device (e.g., a computer-readable medium) and so that image 2 can be restored by imaging to another separate destination device (e.g., another computer-readable medium), according to the invention.
Figure 8:
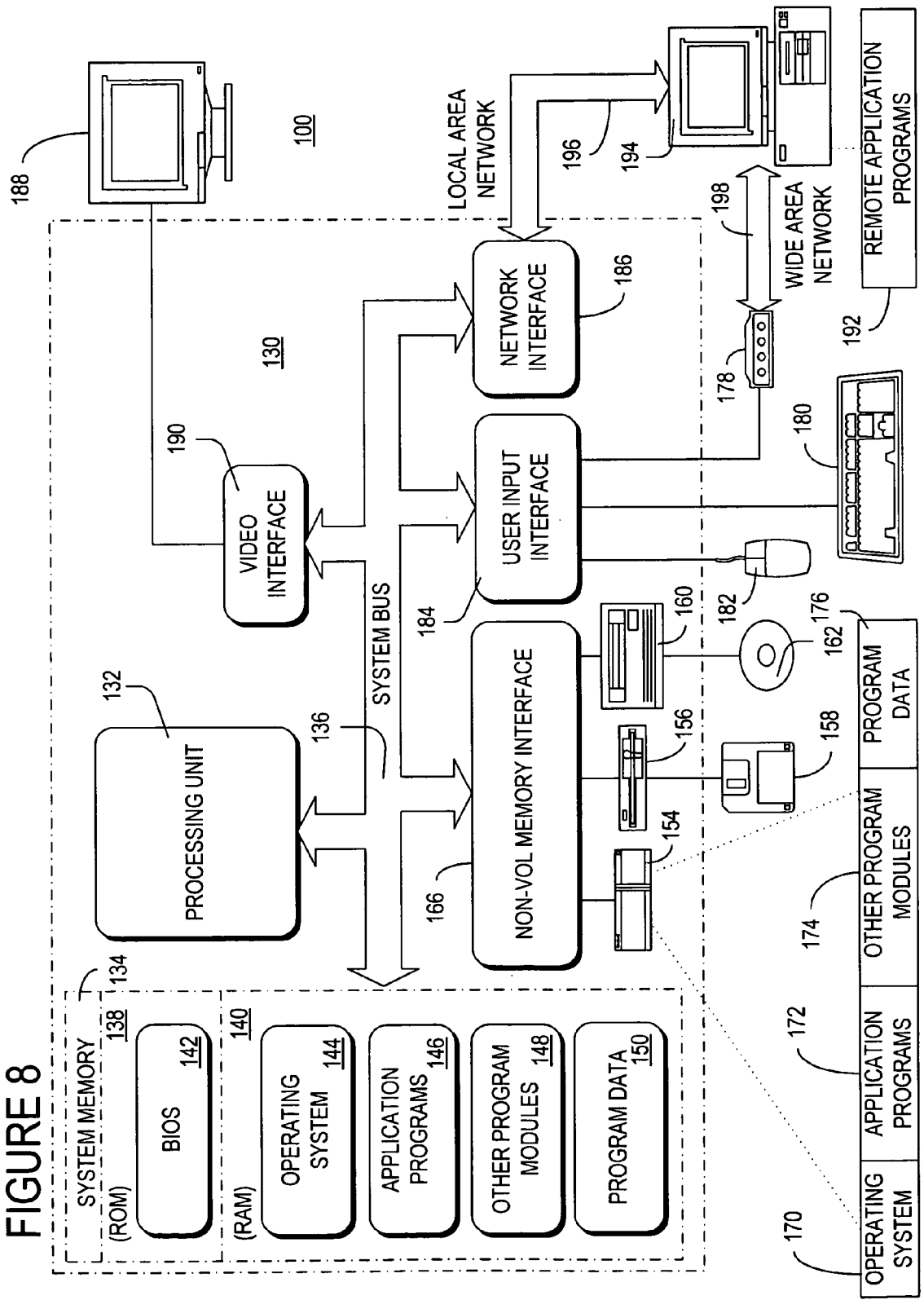
FIG. 8 is a block diagram illustrating one example of a suitable computing system environment in which the invention may be implemented as an image server store and/or as a destination device.

Referring next to FIG. 7, this diagram illustrates one advantage according to the invention of creating a combined image 500 on a sever store so that a first image 502 can be restored on a destination device from the combined image 500 on the server store and/or a second image 504 can be restored on the same or another destination device from the combined image 500 on the server store. Another example where this advantage may be applicable is a software application which has different SKUs and/or editions for use with different operating systems. To a large extent, these various editions of software have a large amount of common data. However, it has been the practice in the past to image each one of these editions separately. Thus, a vendor that was selling these various editions would be required to inventory each one of the editions separately on a separate computer-readable medium. According to one aspect of the invention, these various editions of the software may be combined into a single combined image 500 from which any one of the editions 502, 504 may be recreated. It is also contemplated that the combined image 500 may be used with an executable file 506 is part of an external set-up program or other tool for extracting an image. The file 506, when executed, extracts a particular one of the images used to create the combined image. It is further contemplated that the executable file may operate in response to a product key (P.K.) or an identifier (I.) associated with the software which is input by a user.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of creating an image, from a combined software image, of a data structure of software on a destination device from a server store, said method comprising:
    providing the combined software image including a first software image and a second software image, said combined software image including one copy of common file data common to both the first software image and the second software image, said combined software image including descriptive data of the first software image comprising:
    a first metadata of the first software image, said first metadata identifying a location of first file data of only the first software image and identifying a location of the common file data, said first metadata pointing to a first offset table, said first offset table including an offset of the location of the first file data on the combined software image, said first offset table including a unique identification, location, size, any flags relating to the first software image; and
    including descriptive data of the second software image comprising:
    a second metadata of the second software image, said second metadata identifying a location of second file data of only the second image and identifying a location of the common file data, said second metadata pointing to a second offset table, said second offset table including an offset of the location of the second file data on the combined software image, said second offset table including a unique identification, location, size, any flags relating to the second software image;
    creating a first image by copying an image of the descriptive data of the first software image from the combined software image to a first destination device;
    wherein creating the first image includes copying an image of the first file data of the first software image from the combined software image to the first destination device as a function of the descriptive data of the first software image;
    creating a second image by copying an image of descriptive data of the second software image from the combined software image to a second destination device, said descriptive data identifying a location of file data of the second software image in the combined software image; and
    wherein creating the second image includes copying an image of the second file data of only the second software image from the combined software image to the second destination device as a function of the descriptive data of the second software image.

2. The method of claim 1 further comprising:
    copying the image of descriptive data of the first software image from the combined software image to a second destination device;
    copying the image of the file data of the first software image from the combined software image to the second destination device as a function of the descriptive data of the first software image.

3. The method of claim 1, further comprising:
    linking the server store to the first destination device.

4. The method of claim 1 further comprising accessing the server store and manipulating the file data of the first software image in the combined software image.

5. The method of claim 1, wherein providing the combined software image comprises copying the combined software image onto the server store.

6. The method of claim 1, wherein the descriptive data is stored in an offset table.

7. The method of claim 1, further comprising, in response to a product key or an identifier corresponding to the first software image or the second software image, selectively transmitting the first software image or the second software image to the first destination device or the second destination device.

8. A system comprising:
    a combined software image from which a first software image and a second software image different from the first software image can be re-created as a function of descriptive data of the first software image and descriptive data of the second software image;
    said descriptive data of the first software image comprising a first metadata of the first software image, said first metadata identifying a location of first file data of only the first software image and identifying a location of the common file data, said first metadata pointing to a first offset table, said first offset table including an offset of the location of the first file data on the combined software image, said first offset table including a unique identification, location, size, any flags relating to the first software image; and
    said descriptive data of the second software image comprising a second metadata of the second software image, said second metadata identifying a location of second file data of only the second image and identifying a location of the common file data, said second metadata pointing to a second offset table, said second offset table including an offset of the location of the second file data on the combined software image, said second offset table including a unique identification, location, size, any flags relating to the second software image, said combined software image including only one copy of file data common to both the first software image and the second software image;
    a server store having said combined software image;
    a link;
    a processor;
    an executable file stored on a destination device and executable by the processor, said executable file being a part of an external set-up program for extracting the first software image or the second software image from the server stored in response to a product key or an identifier, said product key or said identifier corresponding to the first software image or the second software image; and
    wherein the destination device connected to the server store via the link, said destination device having the first software image or the second software image thereon, which first software image or the second software image on the destination device was copied from the combined software image via the link as a function of the executable file and the locations of the first file data of the first software image or the second file data of the second software image within the combined software image.

9. The system of claim 8, further comprising an image of the descriptive data and an image of the file data of the first software image.

10. The system of claim 9 wherein the descriptive data comprises metadata including one or more of the following: file names, attributes, file times, compression formats, locations and streams.

11. The system of claim 9 wherein the file data comprises any binary file data or any other data other than metadata.

\* \* \* \* \*